T. L. & T. J. STURTEVANT.
CRUSHING MILL.
APPLICATION FILED NOV. 9, 1910.
1,027,294.
Patented May 21, 1912.
6 SHEETS—SHEET 1.
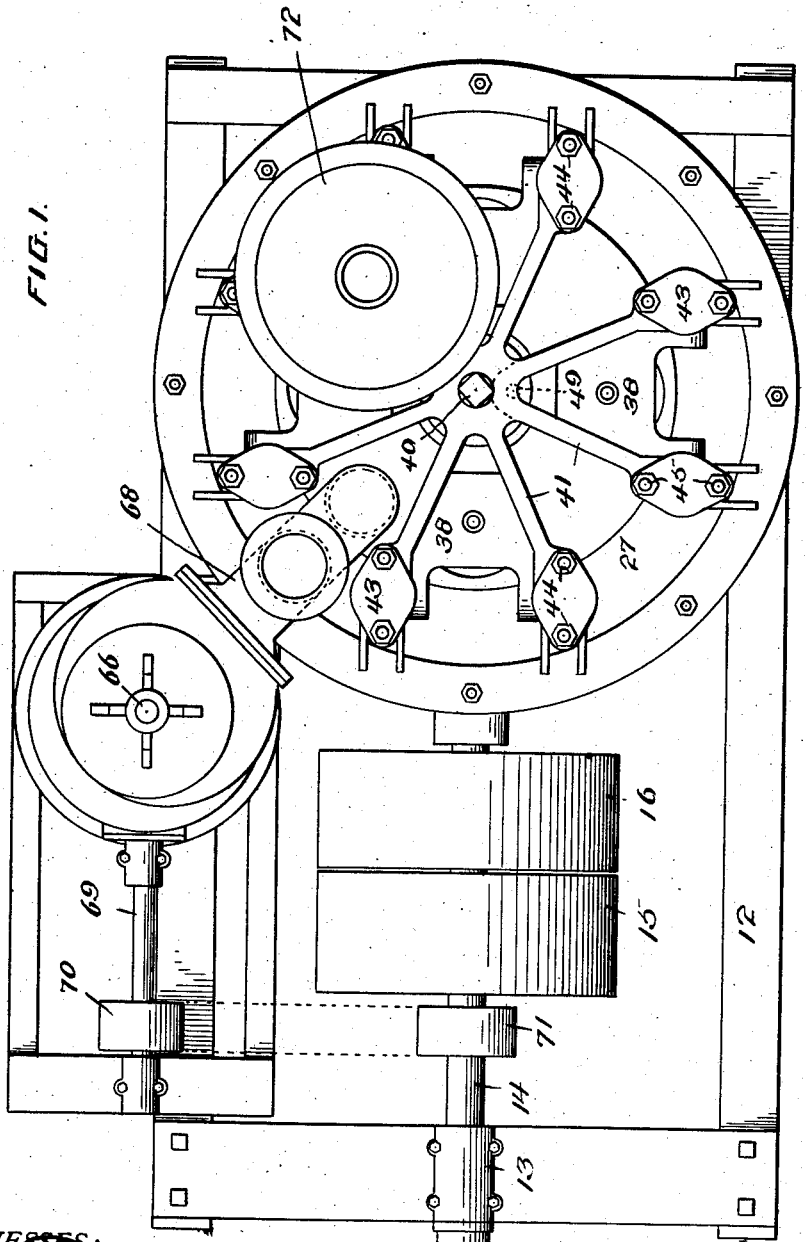

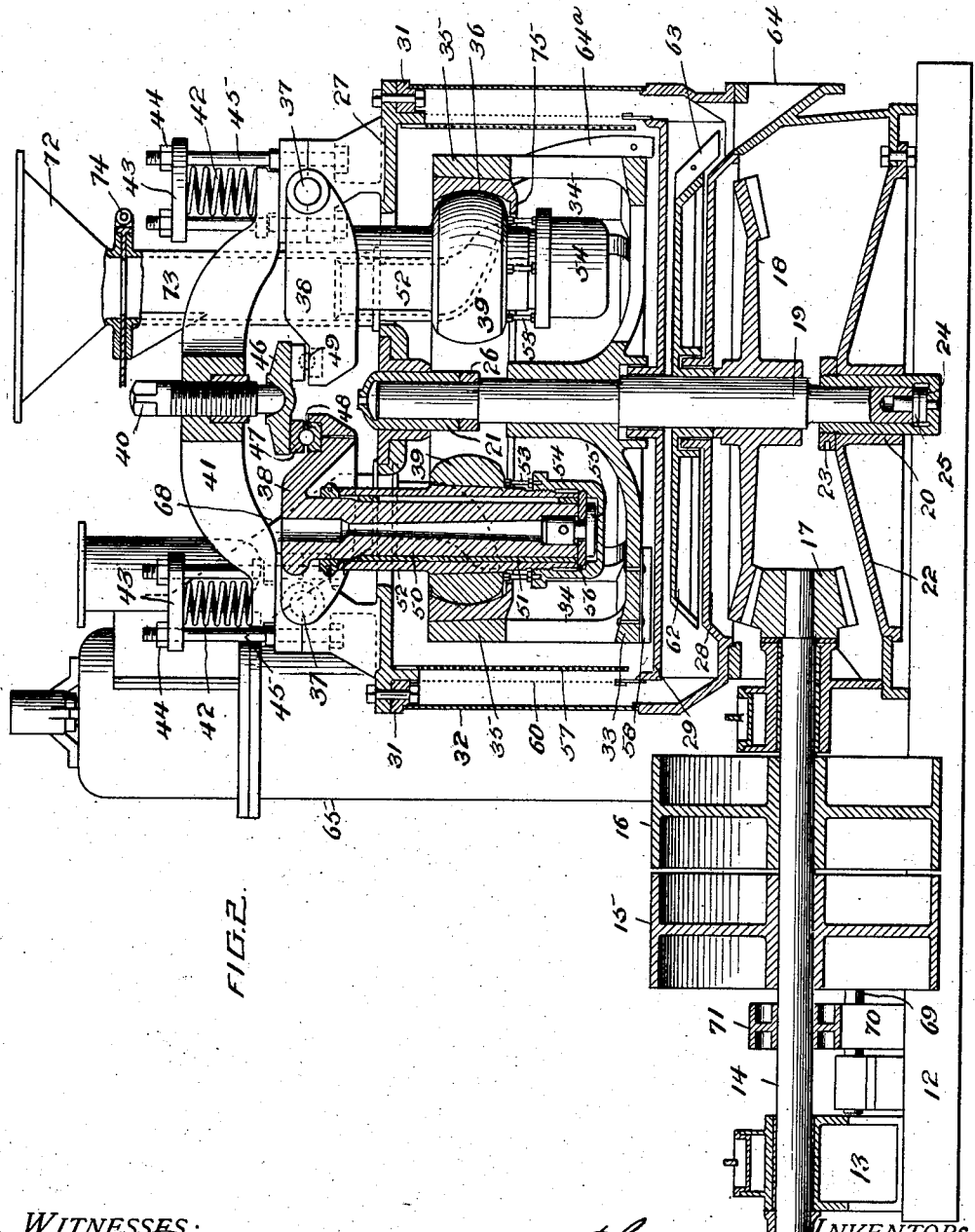

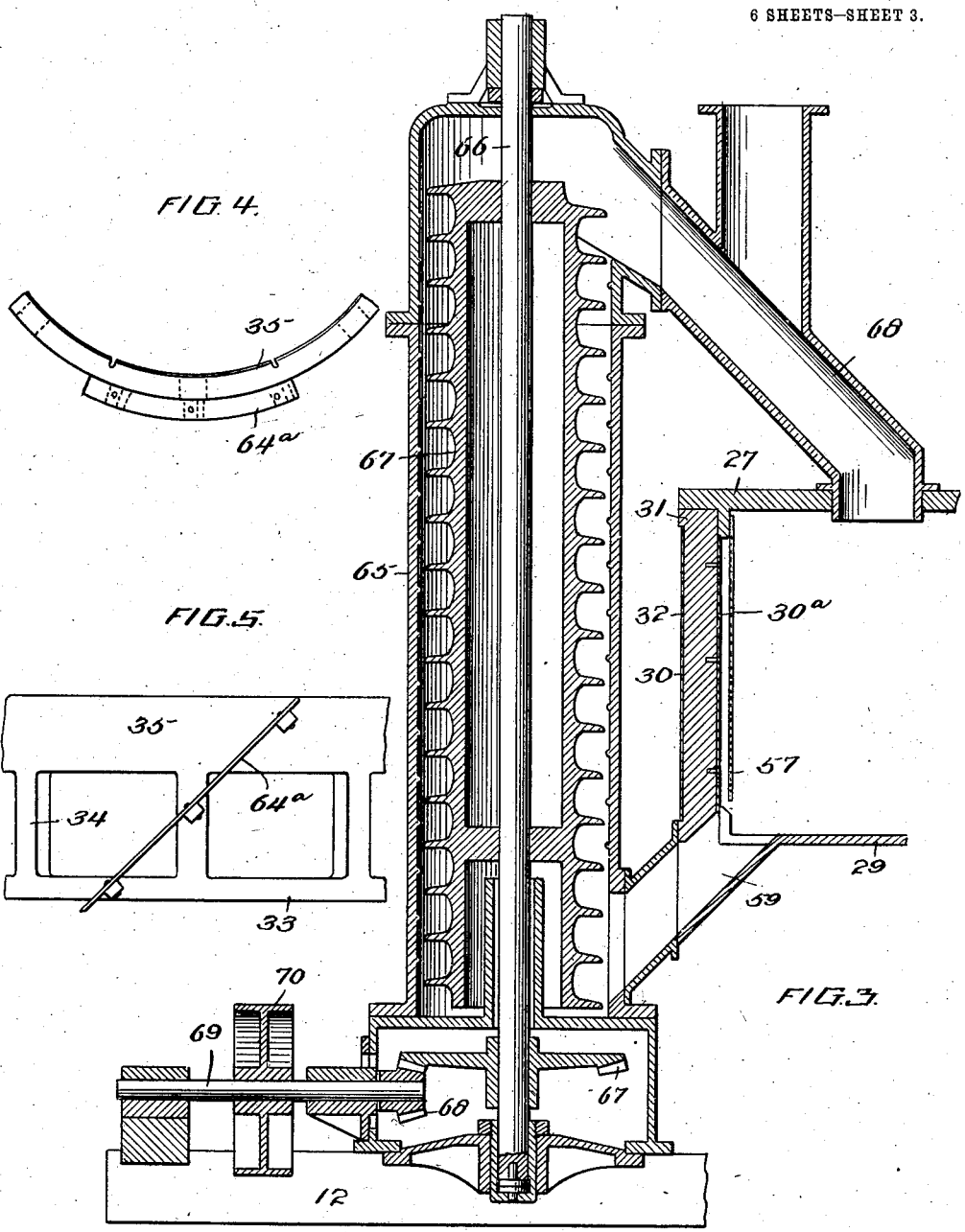

T. L. & T. J. STURTEVANT.
CRUSHING MILL.
APPLICATION FILED NOV. 9, 1910.

1,027,294.

Patented May 21, 1912.

6 SHEETS—SHEET 4.

WITNESSES:

INVENTORS:

BY

Attorneys.

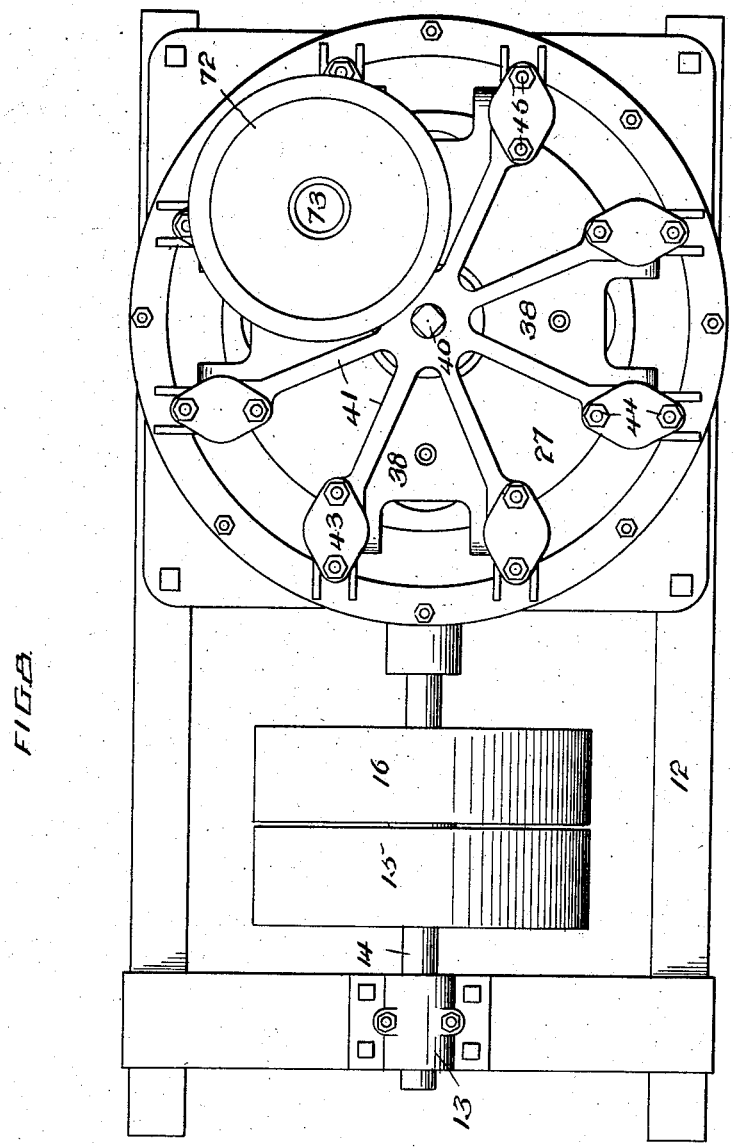

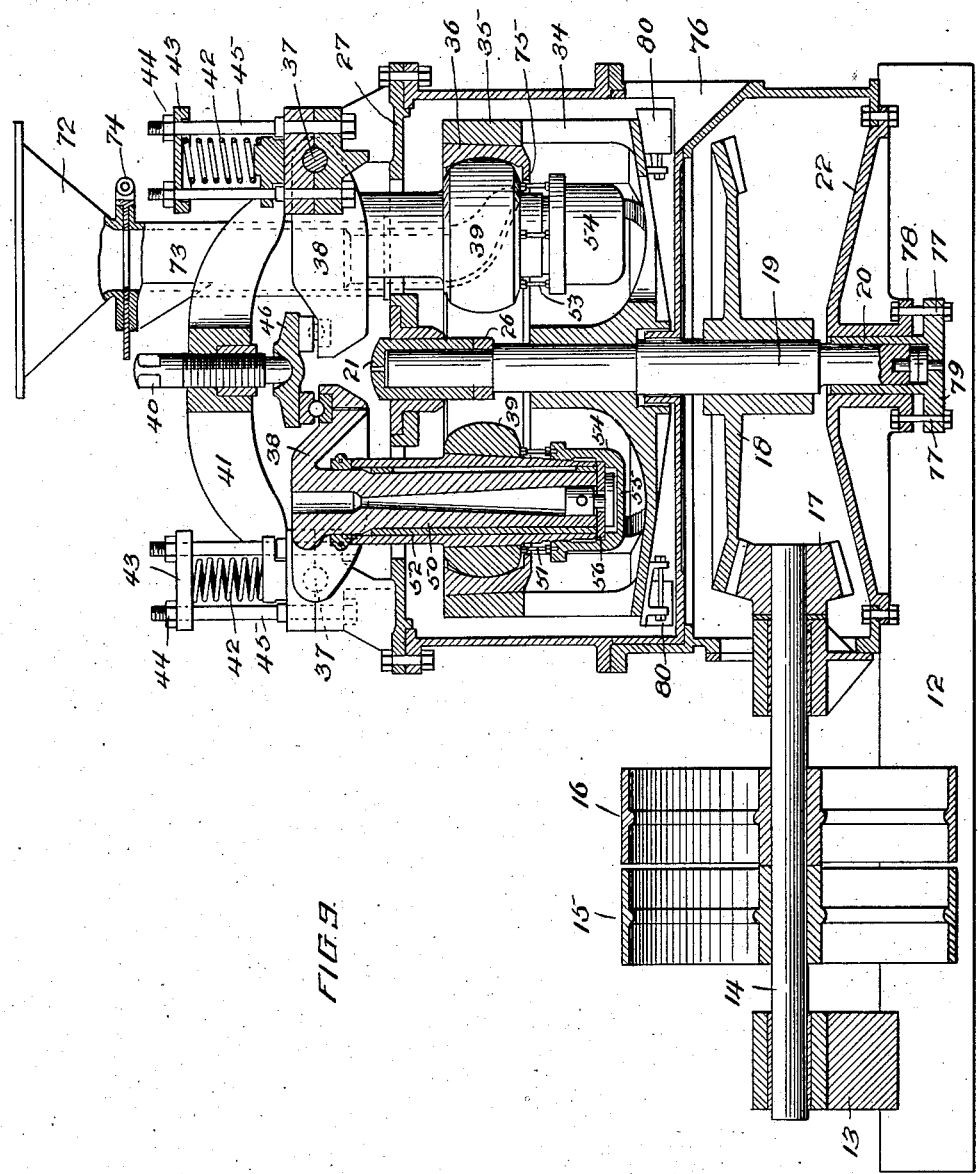

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, A CORPORATION OF MAINE.

CRUSHING-MILL.

1,027,294.  Specification of Letters Patent.  Patented May 21, 1912.

Application filed November 9, 1910. Serial No. 591,497.

*To all whom it may concern:*

Be it known that we, THOMAS L. STURTEVANT and THOMAS J. STURTEVANT, citizens of the United States, residing, respectively, at Quincy and Wellesley, in the county of Norfolk and State of Massachusetts, have invented or discovered certain new and useful Improvements in Crushing-Mills, of which the following is a specification, reference being had therein to the accompanying drawings.

This invention relates to that class of crushing or pulverizing mills in which the material to be reduced is fed to a rotating anvil ring where it is acted on by crushing or hammer rolls which are rotated by frictional contact with the material interposed between the faces of said rolls and the anvil ring, the said hammer rolls being forced outward toward the inner or working face of the anvil ring by spring pressure; the material to be reduced being held against the inner face of the crushing ring partly or mainly by centrifugal force as the ring rotates.

The present invention has for its object to provide a compact form of crushing mill, of the class referred to, and which can be made at somewhat less cost than similar mills of the same capacity, and in which the anvil rings rotate in a vertical plane. To this end the anvil ring of this improved machine is arranged to rotate in a substantially horizontal plane, and is preferably carried by a vertical shaft; the hammer rolls being carried by suspended posts or spindles preferably forming parts of bell-crank levers which are acted on by spring pressure in such a manner as to force the hammer rolls outward toward the inner face of the anvil ring.

This invention comprises certain features which will be hereinafter more particularly set forth and pointed out in the claims appended to the specification.

Figure 6:
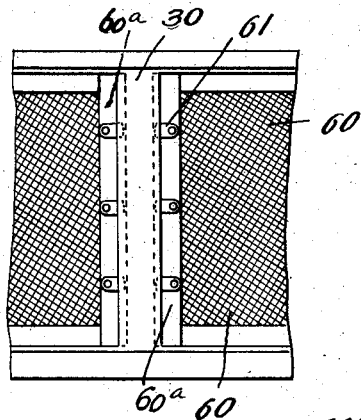
Figure 7:
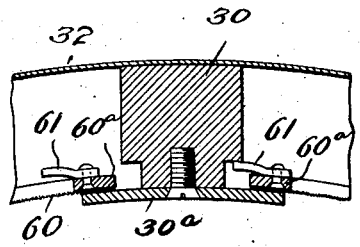
Figure 10:
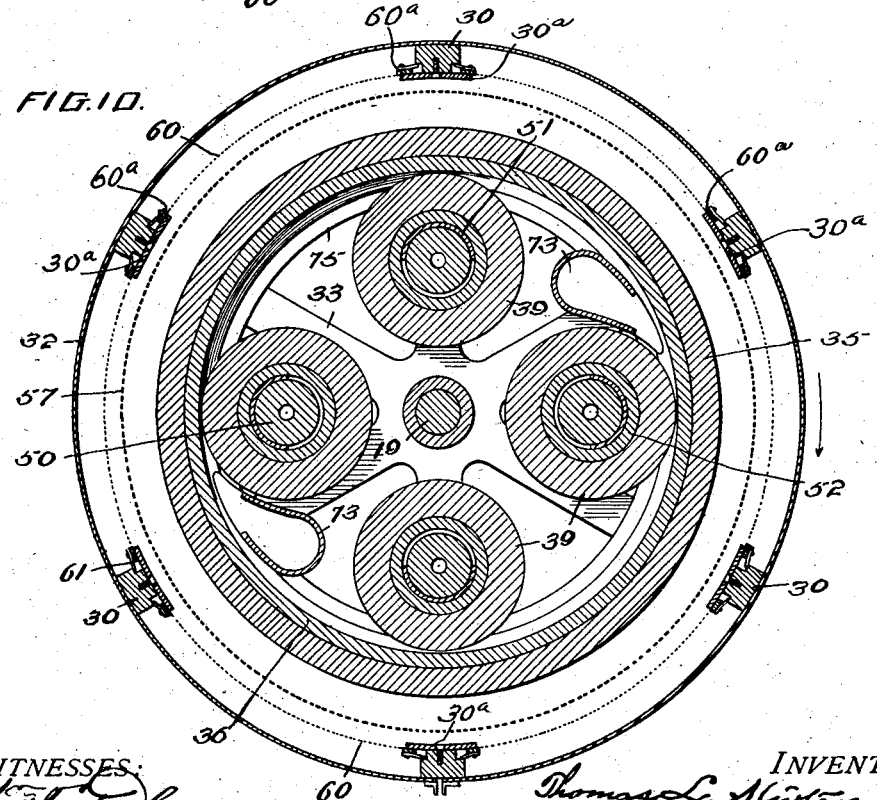

In the accompanying drawings Figure 1 is a plan view of a crushing mill embodying one form of the present invention. Fig. 2 is a vertical longitudinal sectional view of the same, with some parts in elevation. Fig. 3 is a vertical section illustrating the conveyer which returns the tailings of the mill to the chamber of the mill for regrinding. Figs. 4 and 5 are detail views to show one of the agitating wings or plows which whirl the crushed material about in the chamber of the mill so as to assist in effecting the screening operation. Figs. 6 and 7 are detail views to illustrate the means by which the fine mesh screen is secured in place. Figs. 8 and 9 are plane and vertical sectional views, respectively, of a somewhat different form of mill from that shown in Figs. 1 and 2, but made on a similar plan, so far as concerns its general construction and operation. Fig. 10 is a horizontal sectional view illustrating the use of two feed spouts.

Referring to the drawings, 12 denotes a suitable base or frame which supports the mill casing, and to which base or frame is bolted a standard 13 forming one of the bearings for the driving shaft 14 provided with fast and loose pulleys 15 and 16. The shaft 14 is provided at its inner end with a bevel pinion 17 meshing with a bevel gear 18 which is secured to the vertical mill shaft 19 near the lower end of the latter. The shaft 19 is stepped at its lower end in a bearing box 20 and has a bearing at its upper end in a bearing box 21. The lower bearing box 20 is slidably mounted in a base plate 22 of the machine frame so that it may be raised or lowered, such adjustment being effected, in the construction shown in Fig. 2, by means of a screw collar 23 engaging the upper threaded outer portion of said box and resting on the said base plate. Within the lower bearing box 20 are provided suitable anti-friction disks 24 and 25 which afford the stepped bearing for the shaft 14. The upper bearing box 21 is sustained by a collar 26 on the shaft 19, and is slidably mounted in the removable upper end head 27 of the mill casing, said bearing thus being free to move vertically when the position of the shaft 19 is varied by the adjustment afforded by the collar 23.

The mill casing consists, in the construction shown in Fig. 2, of a double floor part comprising the lower and upper floors 28 and 29 extending upward from which are suitable posts 30 surmounted by an upper annular portion or ring 31 which supports the upper removable end head 27. Between the floor portions of the casing and the upper ring 31 is provided a thin metal casing part 32 suitably secured in place, and thus serving as an outer wall for the chamber of the mill.

The vertical shaft 19 carries a spoked head or spider 33 from which extend upward vertical spokes or arms 34 at the top of which is a ring or head 35 to which is attached the concaved-faced anvil ring 36. This spoked or open construction of the anvil ring carrier enables the reduced material to be discharged from both the top and bottom of said anvil ring, or from both sides thereof. Mounted on the upper end head 27 of the mill casing, at pivotal points 37, are bell-crank carriers 38 which support the hammer rolls 39, the inwardly extending arms of said bell-crank carriers being acted on by an adjustable pressure bolt 40 tapped in the central portion of a pressure spider 41 the outer ends of the arms of which are forced downward by springs 42 interposed between said outer ends of said arms and pressure plates 43 engaged by nuts 44 on bolts 45 supported by the said upper end head 27. The pressure bolt 40 bears at its inner end on a plate or disk 46 beneath which are bearing parts or blocks 47 above similar bearing parts or blocks 48 seated in the inner arms of the bell-crank carriers 38, and between the bearing blocks 47 and 48 are interposed balls 49. This construction enables the pressure of the bolts 40 to be suitably distributed or equalized on the several bell-crank carriers for the hammer rolls 39.

Each of the bell-crank carriers 38 preferably comprises a post or spindle 50 surrounded by a non-rotating bushing 51 which is in turn encircled by a rotating sleeve 52 having a tapered portion on which the hammer roll 39 is seated; the said hammer roll being preferably held to its seat by means of screw bolts 53 tapped at their lower ends in a cap 54, and the said heads of which bolts may be backed up against the hammer roll to hold it in place. The cap 54 is attached to the lower end of the rotating bearing sleeve 52 in any suitable manner, and interposed between said cap and the said sleeve is a thrust washer 56 coacting with a thrust lug 55 to hold said hammer roll up in its operative position. The shaft 19, carrying the anvil ring 36 may be raised or lowered, by means of the screw collar 23 on the lower bearing box 20 to bring the said anvil ring into any desired position relative to the hammer rolls 39.

Suitably mounted within the mill casing outside of the rotating anvil ring carrier and anvil ring is a guard screen 57 which may consist of a foraminous metal plate, or of coarse mesh woven wire. This guard screen prevents the outward passage, under centrifugal force, of the coarser part of the material which is being reduced, and which coarser or unreduced material falls down and is received upon the upper floor 29. The rotating spider 33 is provided beneath with scrapers 58 which will carry such unreduced material down to an upper discharge spout 59. The coarse-mesh guard screen 57 serves not only to stop the coarser material, but also serves to protect the outer fine-mesh screen 60 which, like the screen 57, encircles the anvil ring and is preferably made in sections attached to button-bars 60$^a$ secured by suitable pivoted buttons 61 to the posts or bars 30 forming part of the frame or casing of the mill, said button-bars being held in contact with plates 30$^a$ attached to said posts. The material which is not fully reduced and which cannot therefore pass through the fine-mesh screen 60 also falls down onto the upper floor 29 and is discharged with the coarse material which cannot pass through the guard screen 57. Outside of the fine-mesh screen 60 and between said screen and the casing 32 is a vertical chamber into which the fully reduced material passes and which vertical chamber communicates with the space or chamber between the upper floor 29 and the lower floor 28 of the mill casing, said lower floor thus receiving the finely reduced material. Attached to the vertical shaft 19 within said space or chamber between the said floors is a rotating scraper head or disk 62 provided with one or more scrapers 63 which extend into the annular chamber or pocket which receives the finely reduced material, to carry such material around to a discharge spout 64.

To insure a proper agitation of the material for the screening operation the spoked or open-work anvil ring carrier, comprising the parts 33, 34 and 35, is provided with one or more inclined wings or blades 64$^a$ which will serve to whirl the material, discharged from the anvil ring, about in the chamber of the mill, and facilitate its passage outward through the screens 57 and 60.

The discharge spout 59 for the tailings or coarser unreduced material communicates with the chamber of an elevator casing 65 within which is journaled the vertical shaft 66 of a lifting screw conveyer 67 which carries the tailings upward and discharges the same through a spout 68 into the chamber of the mill, for further reduction. The shaft 66 is provided near its lower end with a gear wheel 67 meshing with a pinion 68 on a shaft 69 which is provided with a pulley 70 which may be belted to a pulley 71 on the driving shaft 14. To prevent the tailings or unreduced material which is being lifted by said screw conveyer from rotating with said conveyer the interior of the elevator casing is preferably roughened, knobbed or corrugated.

The material to be reduced is fed to the chamber of the mill from a hopper 72 through a feed spout 73 having a curved and inclined lower end which will direct the material tangentially against the face of the anvil ring closely adjacent to one of the hammer rolls, so that the material will be quickly caught by the roll, and being also quickly acted on by centrifugal force will be retained on the face of the anvil ring for proper action by the succeeding hammer rolls. The hopper 72 will preferably be provided at its bottom with a suitable slide 74 to regulate the feed of the material, so that the feed spout 73 will not be choked with the material, the latter falling a sufficient distance so that it will be discharged from the feed spout against the anvil ring tangentially and with considerable velocity. The feed spout 73 is preferably curved at its lower end in the direction in which the anvil ring is rotating, and thus the discharge of the material with considerable velocity against the anvil ring will not only tend to keep the material in place on the anvil ring but will also have a tendency to assist in the rotation of the anvil ring, rather than to retard the rotation thereof. Instead of feeding the material to be reduced to the anvil ring through a single feed spout, a plurality of such feed spouts, discharging the material as aforesaid against the inner face of the said ring in the direction of its rotation, as shown in Fig. 10, might be employed.

To assist in preventing the material fed to the anvil ring from being discharged too quickly from the lower portion of said ring the latter may be provided with an annular inwardly extending flange or shelf 75 from which the lower faces of the hammer rolls 39 will preferably be somewhat separated so that the material resting on said flange or shelf will be ground between the lower faces, near the peripheries of said rolls, and the said flange or shelf, and will thus be more or less reduced through the assistance afforded by the said flange or shelf. The said flange or shelf may be formed integral with the ring or may be formed separate from the ring and be detachably secured thereto.

The flange or shelf 75 assists in supporting the crushing rolls vertically through the material resting thereon.

The fall of the incoming material from the feed regulating slide 74, at the bottom of the hopper 72, through the feed spout 73, and which material strikes against the curved or inclined lower end of the feed spout as it falls, will cause the material to be discharged tangentially and with considerable velocity against the rotating anvil ring, as hereinbefore stated. Two advantageous results are effected by thus feeding the material to the anvil ring. If the incoming material were slowly fed to the rapidly rotating, horizontally disposed, anvil ring, the inertia of the slowly-moving material would have a tendency to cause the material to escape from the anvil ring before it could attain such velocity of movement as would cause it to be held in place by centrifugal force; and the discharge of slow-moving material against the rapidly rotating anvil ring would cause considerable wear of the anvil ring in the reduction of ores or other hard material, owing to the slip of the material on the anvil ring, and this slip and wear will be greatly avoided by discharging the material against the anvil ring at a speed approximately equal to the speed of movement of the anvil ring. Furthermore by discharging the material against the anvil ring closely adjacent to one or more of the crushing rolls the material will be quickly seized by the adjacent crushing roll before it can escape from the anvil ring.

The machine shown in Figs. 8 and 9 is essentially the same as the machine shown in Figs. 1 and 2, excepting that no provision is made in this machine shown in Figs. 8 and 9 for screening the material, which will all be discharged through the spout 76 and will be sifted in an independent screening machine or separator. In the construction shown in Fig. 9 the means for regulating the height of the vertical shaft 19, to bring the anvil ring in any desired position of adjustment relative to the hammer rolls, is effected by means of bolts 77 passing through a flange 78 in the base plate 22, and engaging a flange 79 on the lower bearing box 20, the said bolts having threaded nuts thereon. The other parts of this machine illustrated in Figs. 8 and 9 are essentially the same as the corresponding parts of the machine shown in Figs. 1 and 2, excepting that the scrapers 80 on the rotating anvil ring carrier are of slightly different form than the corresponding scrapers 58 shown in Fig. 2.

The improved mill or crushing machine above described is compact in construction and efficient in operation, and may be made at less expense than other ring-roll crushing machines of similar capacity and in which the rings and rolls rotate in a vertical plane instead of in a horizontal plane, as in the present machine. The term "horizontal" as herein used in connection with the plane of rotation of the anvil ring, and the term "vertical" as herein employed to describe the position of the shaft 19 or of the spindles or posts on which the crushing rolls are mounted, are to be considered as being employed in a relative or approximate sense, as it is obvious that the mill might be tilted somewhat, so that the parts referred to, or other parts, might be inclined more or less relative to exact horizontal or vertical planes, without essentially changing the invention, or the results aimed at.

Having thus described our invention we claim and desire to secure by Letters Patent:

1. In a crushing mill, the combination with an anvil ring arranged to rotate in a horizontal plane about a fixed axis, of a spoked or open-work carrier on which said ring is mounted so that the reduced material may be discharged from both sides of, or above and below said ring, one or more crushing hammer rolls coöperating with said ring, a mill casing inclosing said ring and provided with a discharge spout or opening, and scrapers or plows arranged beneath and moving with said carrier and serving to discharge the material which accumulates at the bottom of the mill casing through said spout or opening.

2. In a crushing mill, the combination with a concaved-faced anvil ring arranged to rotate in a horizontal plane about a fixed axis, of a spoked or open-work carrier on which said ring is mounted so that the reduced material may be discharged from both sides of, or above and below said ring, one or more crushing hammer rolls coöperating with said ring, a mill casing inclosing said ring and provided with a discharge spout or opening, and scrapers or plows arranged beneath and moving with said carrier and serving to discharge the material which accumulates at the bottom of the mill casing through said spout or opening.

3. In a crushing mill, the combination with a vertical shaft, of an anvil ring supported from said shaft and rotating in a horizontal plane, an open-work carrier for said ring permitting the crushed material to be discharged downward therefrom, hammer rolls coöperating with said ring, and a stationary vertical feed spout the lower end of which is closely adjacent to said ring and also closely adjacent to one of said rolls, said feed spout being curved and inclined at its lower end in the direction of the rotation of said ring so as to deflect the incoming material against the crushing face and in the general direction of the rotation of said ring, and so that the material will be caught and momentarily held by the roll to which it is first delivered.

4. In a crushing mill, the combination with an anvil ring arranged to rotate in a horizontal plane and provided at its lower edge with an inwardly extending flange or shelf, of a series of hammer rolls coöperating with said flanged ring, an open-work carrier for said ring, permitting the downward discharge of material from said ring, and means for yieldingly forcing the said rolls outward toward said ring.

5. In a crushing mill, the combination with a mill casing, of an anvil ring rotating in a horizontal plane within said casing, a spoked or open-work carrier for said ring, and which carrier enables the reduced material to be discharged from both sides of said ring, means within said casing, outside and in the horizontal plane of said ring, for screening or separating the reduced material, and means, rotating with said ring, for discharging the reduced material from said casing.

6. In a crushing mill, the combination with a frame-work or casing comprising two floors, one above the other, of an anvil ring rotating in a horizontal plane within said casing, a carrier for said ring, a fine screen outside and in the horizontal plane of said carrier permitting the passage of the finely reduced material to one of the floors of said casing, but which screen will prevent the passage of the coarser material, which latter will be received on the other floor of said casing, and means, rotating with said ring and closely adjacent to both of said floors, for discharging both grades of the crushed material therefrom.

7. In a crushing mill, the combination with a mill casing provided with a double floor, of an anvil ring rotating in a horizontal plane within said casing, a spoked or open-work carrier for said ring and which carrier enables the reduced material to be discharged from both sides of said ring, a fine screen outside and in the horizontal plane of said carrier permitting the passage of the finely reduced material to one of the floors of said casing, but which screen will prevent the passage of the coarser material which latter will be received on the other floor of said casing, and means, rotating with said ring, for discharging both grades of the crushed material from said casing.

8. In a crushing mill, the combination with a mill casing provided with a double floor, of an anvil ring rotating in a horizontal plane within said casing, a spoked or open-work carrier for said ring and which carrier enables the reduced material to be discharged from both sides of said ring, a fine screen outside and in the horizontal plane of said carrier permitting the passage of the finely reduced material to one of the floors of said casing, but which screen will prevent the passage of the coarser material which latter will be received on the other floor of said casing, means, rotating with said ring, for discharging both grades of the crushed material from said casing, and a guard screen inside of said fine screen and which guard screen will not only protect the fine screen but will prevent the passage of the coarser material.

9. In a crushing mill, the combination with a mill casing, of an anvil ring rotating in a horizontal plane within said casing, a spoked or open-work carrier for said ring and which carrier enables the reduced material to be discharged from both sides of said ring, means within said casing, outside of said carrier and in the horizontal plane of said ring, for screening or separating the reduced material, means, within the screening means, and rotating with said ring, for agitating the material within the mill casing to facilitate the screening operation, and means, rotating with said ring, for discharging the reduced material from said casing.

10. In a crushing mill, the combination with a mill casing, of an anvil ring rotating in a horizontal plane within said casing, a spoked or open-work carrier for said ring and which carrier enables the reduced material to be discharged from both sides of said ring, means within said casing, outside of said carrier and in the horizontal plane of said ring, for screening or separating the reduced material, wings or blades on the outside of said ring, for agitating the material within the mill casing to facilitate the screening operation, and means, rotating with said ring, for discharging the reduced material from said casing.

11. In a crushing mill, the combination with a mill casing, of an anvil ring rotating in a horizontal plane within said casing, an open-work carrier for said ring, means within said casing outside of said carrier, for screening or separating the reduced material discharged from both sides of said ring, means for discharging the material, thus separated, from said casing, and means for returning the tailings or unreduced material to the mill casing for further reduction.

12. In a crushing mill, the combination with a mill casing, of an anvil ring rotating in a horizontal plane within said casing, a carrier for said ring, means within said casing, outside of said carrier, for screening or separating the reduced material, means for discharging the material thus separated from said casing, an elevator casing outside of said mill casing and into the chamber of which elevator casing the coarser material is discharged, an elevating conveyer in said elevator casing for raising the unreduced material and returning same to the chamber of the mill casing for further reduction, and means for operating said conveyer.

13. In a crushing mill, the combination with a mill casing, of an anvil ring rotating in a horizontal plane within said casing, a carrier for said ring, means within said casing outside of said carrier, for screening or separating the reduced material, means for discharging the material thus separated from said casing, an elevator casing outside of said mill casing and into the chamber of which elevator casing the coarser material is discharged, a screw conveyer in said elevator casing for raising the unreduced material and returning same to the chamber of the mill casing for further reduction, and means for operating said conveyer.

14. In a crushing mill, the combination with a mill casing, of an anvil ring rotating in a horizontal plane within said casing, a carrier for said ring, means within said casing, outside of said carrier, for screening or separating the reduced material, means for discharging the material, thus separated, from said casing, an elevator casing outside of said mill casing and into the chamber of which elevator casing the coarser material is discharged, said elevator casing having a roughened or uneven interior surface, a screw conveyer in said elevator casing for raising the unreduced material and returning same to the chamber of the mill casing for further reduction, and means for operating said conveyer.

15. In a crushing mill, the combination with a horizontally-rotating anvil ring having an inner crushing face, an open-work carrier for said ring, of one or more hammer rolls coöperating with said ring to crush material and discharge the same from both sides of said crushing face, or above and below said ring, when the same is rotated, and a feed spout leading to the said interior crushing face of said ring and arranged to discharge the material to be reduced upon said ring in the direction of the rotation of the latter, and closely adjacent to one of said rolls, so that said material will be caught and momentarily held on said crushing face to be reduced by said roll or rolls.

16. In a crushing mill, the combination with a horizontally-rotating anvil ring having an inner crushing face, and an open-work carrier for said ring, of one or more hammer rolls coöperating with said ring to crush material and discharge the same from both sides of said crushing face, or above and below said ring, when the same is rotated, a vertical feed spout leading to the said interior crushing face of said ring and having a curved and inclined lower end arranged to discharge the material to be reduced upon said ring in the direction of the rotation of the latter and closely adjacent to one of said rolls, so that said material will be caught and momentarily held on said crushing face to be reduced by said roll or rolls, a feed hopper at the upper end of said spout, and a feed-regulating slide which will permit the incoming material to drop in said feed spout so as to be discharged with considerable velocity.

17. In a crushing mill, the combination with an anvil ring arranged to rotate in a horizontal plane, of a spoked or open-work carrier on which said ring is mounted so that the reduced material may be discharged from both sides of, or above and below said ring, and one or more crushing hammer rolls coöperating with said ring.

18. In a crushing mill, the combination with a concaved-faced anvil ring arranged to rotate in a horizontal plane, of a spoked or open-work carrier on which said ring is mounted so that the reduced material may be discharged from both sides of, or above and below said ring, and one or more crushing hammer rolls coöperating with said ring.

19. In a crushing mill, the combination with a rotating anvil ring and coöperating crushing rolls, of a stationary fine screen encircling said ring and serving to separate the crushed material discharged centrifugally therefrom, and a guard screen also encircling said ring inside of said fine screen.

In witness whereof we affix our signatures, in presence of two witnesses.

THOMAS LEGGETT STURTEVANT.
THOMAS JOSEPH STURTEVANT.

Witnesses:
W. T. ELLIS,
GRACE G. GODFREY.

Copies of this patent may be obtained for five cents each, by addressing the "Commissioner of Patents, Washington, D. C."